Patented Oct. 21, 1941

2,259,513

UNITED STATES PATENT OFFICE 2,259,513

METHODS OF INHIBITING POLYMERIZATION OF UNSATURATED METHYLENE COMPOUNDS

Carl E. Barnes, Worcester, Mass., assignor, by mesne assignments, to E. I. du Pont de Nemours & Company, Wilmington, Del., a corporation of Delaware No Drawing. Application July 8, 1939, Serial No. 283,455. In France March 1, 1939

2 Claims. (Cl. 260—464)

This invention relates to methods of inhibiting polymerization of compounds containing unsaturated methylene groups.

It is accordingly an object of this invention to overcome certain disadvantages of inhibitors previously used and to provide substances and methods of operation which will effectively inhibit the polymerization of various polymerizable compounds.

A further object is to inhibit polymerization by an inhibitor which may be readily separated from the monomer when desired or which will not prevent polymerization by feasible methods or with the aid of a suitable catalyst capable of overcoming the inhibiting action.

Another object is to provide a method of protecting such polymerizable compounds in their monomeric forms and thereafter polymerize the same by procedure that is economical and simple in operation. Further objects will be apparent in the following disclosure.

I have discovered that chromium metal will inhibit polymerization of a polymerizable monomeric acid having the formula

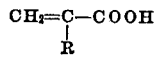

in which R is selected from the group of hydrogen, halogen and a methyl group, and that this inhibiting action will take place during storage and purification by distillation, as well as when the monomer is used in the manufacture of various products. For example, methacrylic acid containing pieces of chromium metal may be readily distilled without polymerization taking place. Also, the monomeric acid may be heated for a week at 100° C. without change. The other acids act similarly.

Chromium metal will also effectively inhibit the polymerization of the monomeric esters of monomeric acrylic acid and the alpha halogen and methyl substituted acrylic acids provided there is present a slight amount of one of said monomeric acids. The crude anhydrides, nitriles and halides of these acids are similarly held from polymerization during storage and purification, due possibly to the presence of a slight amount of the corresponding acid.

I have also discovered that polymerization of the above specified monomeric compounds is inhibited by those chromium salts which are soluble in the monomeric liquid. For example, monomeric methyl methacrylate will be protected by the presence of a small amount of chromium methacrylate or other chromium salt of the acrylic and alpha halogen or methyl substituted acrylic acids which is soluble in the monomer to be protected.

The extremely low degree of solubility of the chromium metal in the monomeric acid and the very slight amount of acid necessary to provide inhibiting conditions for the non-acid monomers makes it possible to maintain the monomer in a substantially pure condition. Hence, the polymer made therefrom is not detrimentally affected, as regards transparency, hardness, brittleness, softening point and other characteristics that may be desired for optical purposes or for use as a bond for abrasive materials or for use as a molding compound. It is a simple procedure to remove the inhibiting metal and thus separate substantially all of the inhibitor from the monomer when it is desired to polymerize the latter. Purification by distillation is not required for making various products, since polymerization of the monomer, after the metal has been removed, may be effected by the use of a suitable catalyst, such as benzoyl peroxide, which needs to be used only in a very small amount to overcome the inhibiting action of the slight amount of chromium salt that may be present in solution.

If it is desired to purify the monomeric substance, such as methacrylic acid, then the monomer may be distilled for the purpose. In that case, chromium metal is introduced into the distilling flask along with the monomer, and chromium metal or other suitable inhibitor may be placed in the distilling column as a packing material, such as chromium granules or other metal packing plated with chromium.

In order to distill the esters of these various acids, I may add a trace of one of the above acids along with the metallic chromium. For example, I may add methacrylic acid to the various esters of methacrylic acid and the monohydric and polyhydric alcohols, such as methyl and ethyl alcohols, or ethylene glycol or the hypothetical ethylidene glycol or allyl alcohol. Crude ethylidene dimethacrylate may be distilled without polymerization by placing chromium metal only in the distilling flask.

While it is believed that all of the monomeric compounds of the group herein described are protected by chromium metal and those salts thereof which form or provide compounds that are soluble in the monomeric substance, yet it is to be understood that this invention is not to be considered as limited by any particular theory as to the operation of the inhibitor or the chemical reactions taking place. Also, the above examples and statements are to be considered as illustrative of the principles and specific applications of the invention and not as limitations on the claims appended hereto.

This case is a continuation in part of my copending application Serial No. 195,816, filed March 14, 1938; and a method of distilling polymerizable compounds is claimed in my copending application Serial No. 253,623, filed January 30, 1939.

I claim:

1. A polymerizable monomeric unsaturated methylene compound selected from the group of the acids having the formula $$CH_2=C(R)-COOH$$

in which R is selected from the group of hydrogen, halogen, and a methyl group, and the esters, anhydrides, halides, and nitriles of said acids, stabilized against polymerization by the addition thereto of a chromium salt which is soluble in said monomeric compound.

2. A polymerizable monomeric unsaturated methylene compound selected from the group of the acids having the formula $$CH_2=C(R)-COOH$$

in which R is selected from the group of hydrogen, halogen, and a methyl group, and the esters, anhydrides, halides, and nitriles of said acids, stabilized against polymerization by the addition thereto of chromium methacrylate.

CARL E. BARNES.